Feb. 7, 1939.   D. C. VAUGHN   2,146,663
ANTIFRICTION BEARING FOR CONNECTING RODS
Filed Sept. 21, 1937   2 Sheets-Sheet 1
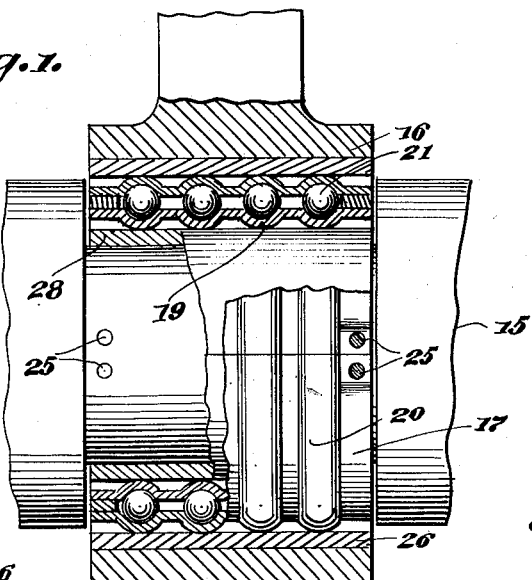
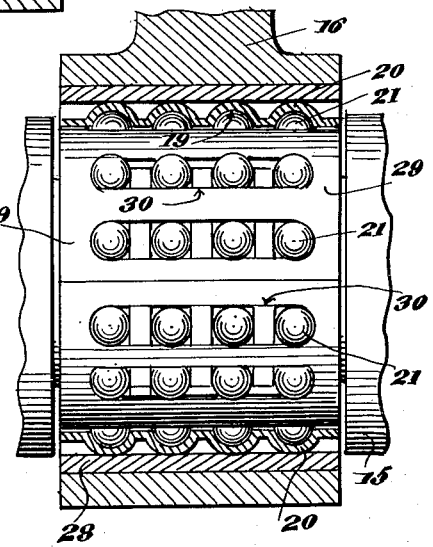
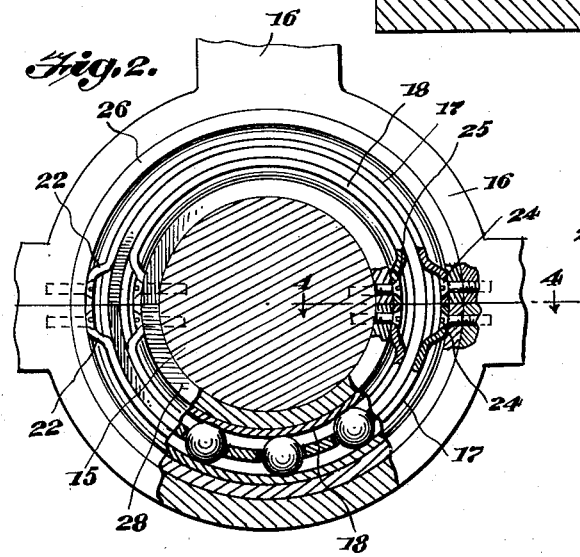
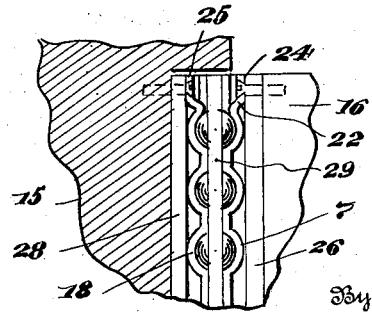
Inventor
DAVID COULTER VAUGHN Feb. 7, 1939.  D. C. VAUGHN  2,146,663
ANTIFRICTION BEARING FOR CONNECTING RODS
Filed Sept. 21, 1937   2 Sheets-Sheet 2
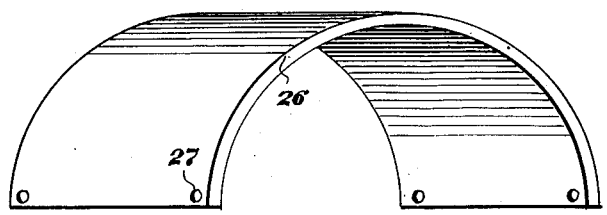
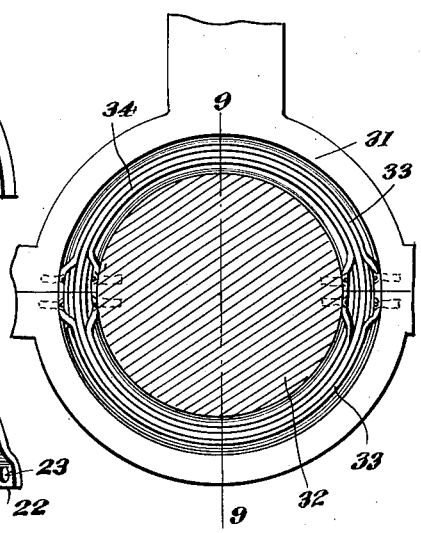
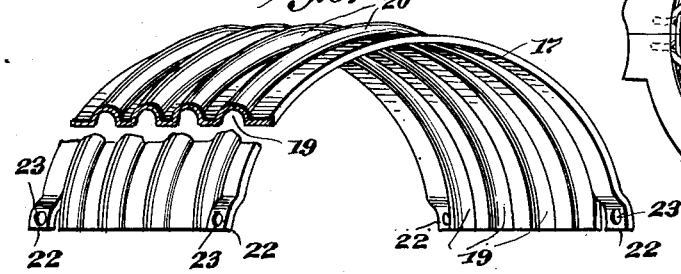
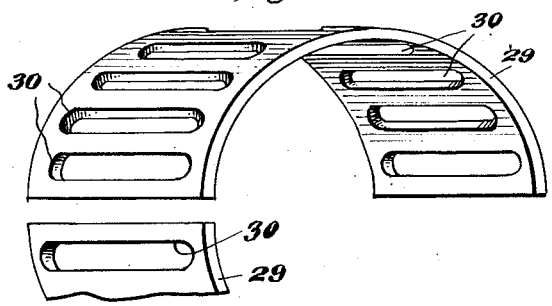
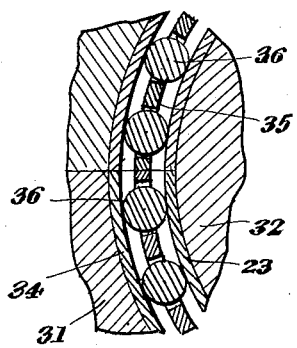
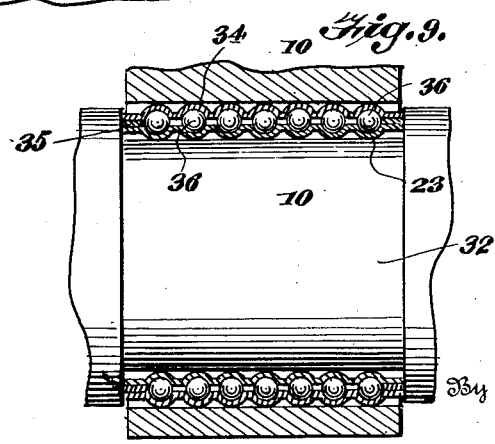
Inventor
DAVID COULTER VAUGHN
By Irving L. McCathran
Attorney Patented Feb. 7, 1939

2,146,663

UNITED STATES PATENT OFFICE 2,146,663

ANTIFRICTION BEARING FOR CONNECTING RODS

David Coulter Vaughn, Tulia, Tex.

Application September 21, 1937, Serial No. 164,961

2 Claims. (Cl. 308—195)

This invention relates to anti-friction bearings for connecting rods, and the like, and has for one of its objects the production of a simple and efficient bearing, the ball races as well as the spacers constituting hardened steel stamping products, thereby providing a bearing which may be produced at a minimum cost, as well as a most practical bearing.

A further object of this invention is the production of a simple and efficient bearing which is especially designed as a replacement bearing for standard motors, whereby the old connecting rod may be used without the necessity of providing a new connecting rod when replacing the bearing.

Other objects and advantages of this invention will appear throughout the following specification and claims.

In the drawings:—

Figure 1 is an axial sectional view through a portion of a connecting rod and crank arm or shaft, the bearing being shown partly in elevation and partly in section;

Figure 2 is an irregular vertical sectional view through the connecting rod and crank arm;

Figure 3 is an axial sectional view showing the outer housing, ball race, and connecting rod in section, and the balls and spacers as well as the crank arm in elevation;

Figure 4 is a sectional view taken on line 4—4 of Figure 2;

Figure 5 is a perspective view of one of the housing segments;

Figure 6 is a perspective view of one of the ball race segments, a portion thereof being shown in section;

Figure 7 is a perspective view of one of the ball spacing segments, a portion of the one end of the other co-acting segment being also shown;

Figure 8 is a vertical sectional view through a crank arm showing a type of bearing used without the housing segments;

Figure 9 is an axial sectional view taken on line 9—9 of Figure 8;

Figure 10 is an enlarged sectional view taken on line 10—10 of Figure 9.

By referring to the drawings, it will be seen that 15 designates the crank arm or crank shaft of the conventional type, upon which fits the conventional connecting rod 16. The present invention relates particularly to a bearing which may be used upon standard motors, whereby it will not be necessary to substitute a new connecting rod or new crank arm or shaft, the present type of bearing being constructed as to fit properly in place.

The bearing comprises a pair of outer segmental races 17 and a pair of inner segmental races 18. The races 17 and 18 are similarly constructed and constitute semi-circular or bowed plates having parallel equally spaced bearing channels 19 pressed from the inner face thereof, and providing upon the outer face rounded ribs 20 extending circumferentially of the races, as shown in detail in Figure 6. These ribs 19 are preferably semi-circular in cross section to provide semi-circular channels for receiving the ball bearings 21 in a manner as shown in Figure 1. Each segmental race is provided with an outwardly pressed portion 22 near each corner to provide a countersunk socket at each corner, the outwardly pressed portion 22 in each instance being apertured, as at 23. As stated above, the segmental races 17 and 18 are similarly constructed, one pair constituting an outer race and the other pair constituting an inner race. The ends of the segmental races 17 are firmly anchored in engagement with the connecting rod 16 in the manner shown in Figure 2 by means of the screws or anchoring members 24 which as shown, pass into the connecting rod, the heads of the anchoring members fitting in the countersunk sockets formed in the corners of the segmental races to hold the heads of the securing members out of frictional contact with any moving part.

The inner races 19 are secured in position by means of anchoring screws or members 25 which engage the respective corners of the inner races 18, as shown in Figure 2, for anchoring the inner races 18 in engagement with the crank arm 15. In some instances, I preferably employ a pair of outer housing segments 26 which comprise segmental plates having apertured corners 27 and fitting as a lining against the inner face of the connecting rod 16, the pair of housing segmental plates 26 having their adjoining ends abutting to provide a continuous lining for the connecting rod, as shown. The anchoring screws or members 24 extend through the apertures 27 and constitute a common anchoring means for the outer segmental races 17, and the outer housing segments.

In some instances, I also employ a pair of inner housing segments 28 similarly constructed but of smaller size than the housing segments 26 and fitting snugly against the crank arm 15, as shown in Figure 2, the ends of the inner housing segments abutting and being anchored in position by means of the anchoring or securing screws 25 which constitute common anchoring means for the inner segmental races and the inner housing segments 28. It should be understood that the channels 19 formed in both the inner and outer segmental races are aligned with respect to the abutting segmental races and that the channels of the outer segmental races overlie the channels of the inner segmental races to provide continuous circular pathways or channels in which the bearing balls or suitable bearings 25 may freely roll. In order that the bearings 21, preferably bearing balls, may be held in proper position and in spaced transverse rows such as is illustrated in Figure 3, I provide a pair of segmental, preferably semi-circular, ball-spacing segments 29 having spaced elongated ball-receiving slots 30 which extend transversely of the segments 29 in a manner as shown in Figure 7. The bearing balls 21 are held in spaced transverse rows by fitting within these slots 30, the major portion of the balls fitting within the channels 19 of the segmental races 17 and 18. The races will hold the balls in spaced relation with respect to the longitudinal axis of the crank arm 15 and the slots 30 will hold the balls in proper spaced transverse rows in the manner as shown in Figure 3.

The ball-spacing segments 29 preferably abut at their adjacent edges, and these ball-spacing segments are free to move between the segmental races, as will be obvious.

By referring to Figures 8, 9 and 10, it will be seen that a modified form of structure is illustrated, wherein I do not employ the housing segments such as are indicated by the numerals 26 and 28 in Figure 2. In the form shown in Figures 8, 9 and 10, there is illustrated a connecting rod 31 similar to the connecting rod 16 and a crank arm 32 similar to the crank arm 15. I also employ a pair of similar circular segmental race plates 33 which are connected directly to the inner face of the connecting rod 31 and are constructed similar to the outer segmental races 17. A pair of semi-circular segmental race plates 34 are also connected and anchored in position upon the crank arm 32 and are constructed similar to the iner race plates 18. A pair of slotted ball-spacing segments 35 are also provided similar to the segments 29 for guiding the bearings 36 and holding the bearings in transverse rows. In this type, as shown in detail in Figure 9, as stated above the inner and outer housing segments such as are indicated by the numerals 26 and 28 are eliminated. Otherwise, the parts are duplicates.

It should be understood that the segmental races, as well as the ball-spacing segments, are stamped from steel and hardened, and that the balls racing in the hardened races will have a maximum wearing surface due to their contacting with the channels formed in the races. This will prolong the life of the balls as well as the races, and will insure a close and snug fitting bearing. When using the modified form shown in Figures 8, 9 and 10, a replacement bearing will be provided to replace various other types of insert bearings, the structure being particularly adapted as a replacement bearing because of the extreme thinness of the bearing. This will eliminate the necessity of employing a new connecting rod since the bearing may be used as a replacement in any standard motor. Furthermore, by making a steel stamping out of the device an inexpensive bearing is provided both in replacement as well as in original work.

Having described the invention, what I claim as new is:—

1. A hardened steel-stamped bearing comprising a plurality of outer segmental race sections having stamped bearing channels upon the inner faces thereof, a plurality of inner segmental race sections having stamped bearing channels upon the inner faces thereof, each race section having its corners cut to form longitudinal tongues, screws passed through the tongues and engaged in threaded sockets formed in the connecting rod and crank arm to detachably mount the race sections, freely movable bearing spacers interposed between the inner and outer races, the spacers having bearing-receiving openings, and bearings fitting in said openings and having a maximum surface contact with said channels of said bearing races.

2. A hardened steel-stamped bearing comprising a plurality of outer segmental race sections having stamped bearing channels upon the inner faces thereof, a plurality of inner segmental race sections having stamped bearing channels upon the inner faces thereof, freely movable bearing spacers interposed between the inner and outer races, the spacers having bearing-receiving openings, and bearings fitting in said openings and having a maximum surface contact with said channels of said bearing races, the segmental race sections having outwardly perforated tongues formed near the corners thereof to provide countersunk anchoring means receiving sockets whereby the anchoring means will be held spaced from the bearing contact face, inner and outer segmental housings having perforations registering with perforations of said tongues, and screws passed through the registering perforations of the race sections and housing sections to detachably hold the same in place.

DAVID COULTER VAUGHN.